(12) United States Patent
Beardsley et al.

(10) Patent No.: US 9,542,330 B2
(45) Date of Patent: *Jan. 10, 2017

(54) SYSTEMS AND METHODS FOR BACKGROUND DESTAGING STORAGE TRACKS

(71) Applicant: INTERNATIONAL BUSINESS MACHINES CORPORATION, Armonk, NY (US)

(72) Inventors: Brent C. Beardsley, Tucson, AZ (US); Michael T. Benhase, Tucson, AZ (US); Binny S. Gill, Shrewsbury, MA (US); Lokesh M. Gupta, Tucson, AZ (US); Sonny E. Williams, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/087,199

(22) Filed: Mar. 31, 2016

(65) Prior Publication Data

US 2016/0217081 A1    Jul. 28, 2016

Related U.S. Application Data

(63) Continuation of application No. 14/727,409, filed on Jun. 1, 2015, now Pat. No. 9,317,447, which is a (Continued)

(51) Int. Cl.
*G06F 12/08* (2016.01)
*G06F 12/12* (2016.01)

(52) U.S. Cl.
CPC ....... *G06F 12/0891* (2013.01); *G06F 12/0804* (2013.01); *G06F 12/0831* (2013.01); *G06F 12/0848* (2013.01); *G06F 12/0866* (2013.01); *G06F 12/0868* (2013.01); *G06F 12/12* (2013.01); *G06F 12/128* (2013.01); *G06F 2212/1041* (2013.01);
(Continued)

(58) Field of Classification Search
CPC  G06F 12/0804; G06F 12/0891; G06F 12/128; G06F 12/0848; G06F 2212/604; G06F 2212/69
USPC .................................................. 711/129, 154
See application file for complete search history.

(56) References Cited

U.S. PATENT DOCUMENTS 5,754,888 A * 5/1998 Yang ..................... G06F 3/0601
                                                                710/52
7,085,892 B2    8/2006  Martinez et al.
(Continued)

OTHER PUBLICATIONS

Young Jin Nam et al., "An Adaptive High-Low Water Mark Destage Algorithm for Cached RAID5," Proceedings 2002 Pacific Rim International Symposium on Dependable Computing, Tsukuba City, Ibaraki, Japan, Dec. 16-18, 2002 (8 pages).
(Continued)

*Primary Examiner* — Matthew Bradley
(74) *Attorney, Agent, or Firm* — Griffiths & Seaton PLLC

(57) ABSTRACT

Storage tracks from at least one host are destaged from the write cache rank when it is determined that the at least one host is idle with respect to a first set of ranks, and storage tracks are refrained from being destaged from each rank when it is determined that the at least one host is not idle with respect to a second set of ranks.

17 Claims, 3 Drawing Sheets

Related U.S. Application Data continuation of application No. 14/174,690, filed on Feb. 6, 2014, now Pat. No. 9,063,863, which is a continuation of application No. 12/965,141, filed on Dec. 10, 2010, now Pat. No. 8,656,109.

(52) U.S. Cl.
CPC .. *G06F 2212/282* (2013.01); *G06F 2212/313* (2013.01); *G06F 2212/314* (2013.01); *G06F 2212/604* (2013.01); *G06F 2212/621* (2013.01); *G06F 2212/69* (2013.01)

(56) References Cited

U.S. PATENT DOCUMENTS

| | | |
|---|---|---|
| 7,191,207 B2 | 3/2007 | Blount et al. |
| 7,721,043 B2 | 5/2010 | Gill et al. |
| 7,725,661 B2 | 5/2010 | Liu et al. |
| 7,783,836 B2 | 8/2010 | Wang |
| 7,793,049 B2 | 9/2010 | Cain et al. |
| 7,805,574 B2 | 9/2010 | Bell, Jr. et al. |
| 2003/0225948 A1 | 12/2003 | Jarvis et al. |
| 2007/0156961 A1 | 7/2007 | Houzenga et al. |
| 2010/0037226 A1 | 2/2010 | Benhase et al. |

OTHER PUBLICATIONS

U.S. Appl. No. 12/965,131, filed Dec. 10, 2010, entitled "Systems and Methods for Managing Cache Destage Scan Times" (29 pages).
U.S. Appl. No. 12/965,141, filed Dec. 10, 2010, entitled "Systems and Methods for Background Destaging Storing Tracks" (28 pages).
U.S. Appl. No. 12/965,174, filed Dec. 10, 2010, entitled "Systems and Methods for Destaging Storage Tracks From Cache" (28 pages).
U.S. Appl. No. 12/965,133, filed Dec. 10, 2010, entitled "Systems and Methods for Managing Destage Conflicts" (22 pages).

* cited by examiner

SYSTEMS AND METHODS FOR BACKGROUND DESTAGING STORAGE TRACKS

CROSS-REFERENCE TO RELATED APPLICATIONS

This application is a Continuation of U.S. patent application Ser. No. 14/727,409, filed on Jun. 1, 2015, which is a Continuation of U.S. Pat. No. 9,063,863, filed on Feb. 6, 2014, which is a Continuation of U.S. Pat. No. 8,656,109, filed on Dec. 10, 2010, the contents of which are incorporated herein by reference. The application is also related to U.S. Pat. No. 8,589,624, filed on Jun. 11, 2012.

BACKGROUND OF THE INVENTION

1. Field of the Invention

The present invention relates in general to computing systems, and more particularly, to systems and methods for background destaging storage tracks from cache when one or more hosts coupled to the cache are idle.

2. Description of the Related Art

One goal of computer storage systems is to reduce the number of destage conflicts when destaging storage tracks from a write cache so that the storage system operates more efficiently and/or faster. A destage conflict can occur when a storage track is being destaged from the write cache while a host is trying to write data to the storage track. This situation may be created because contemporary storage systems typically destage storage tracks shortly after the storage track is written to and the host must wait until the storage track is destaged from the write cache before the host is able to again write to the storage track. One technique to reduce the number of destage conflicts includes keeping storage tracks in the write cache for a longer period of time before destaging the storage tracks so that a storage track may be written to multiple times before the storage track is destaged. While this is an effective technique for reducing destage conflicts, it is also desirable that storage tracks not reside in the write cache too long so that the data in the storage tracks does not become stale.

SUMMARY OF THE INVENTION

Various embodiments provide systems for background destaging storage tracks from cache when one or more hosts is/are idle. In one embodiment, a method is provided for background destaging storage tracks from a write cache configured to store a plurality of storage tracks when at least one host is idle using at least one processor device in a computing environment. In one embodiment, by way of example only, storage tracks from at least one host are destaged from the write cache rank when it is determined that the at least one host is idle with respect to a first set of ranks, and storage tracks are refrained from being destaged from each rank when it is determined that the at least one host is not idle with respect to a second set of ranks.

In addition to the foregoing exemplary method embodiment, other exemplary system and computer product embodiments are provided and contribute related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Various embodiments provide systems and methods for background destaging storage tracks from cache when a host is idle. Also provided are physical computer storage mediums comprising a computer program product for background destaging storage tracks from a write cache configured to store a plurality of storage tracks when a host is idle.

Figure 1:
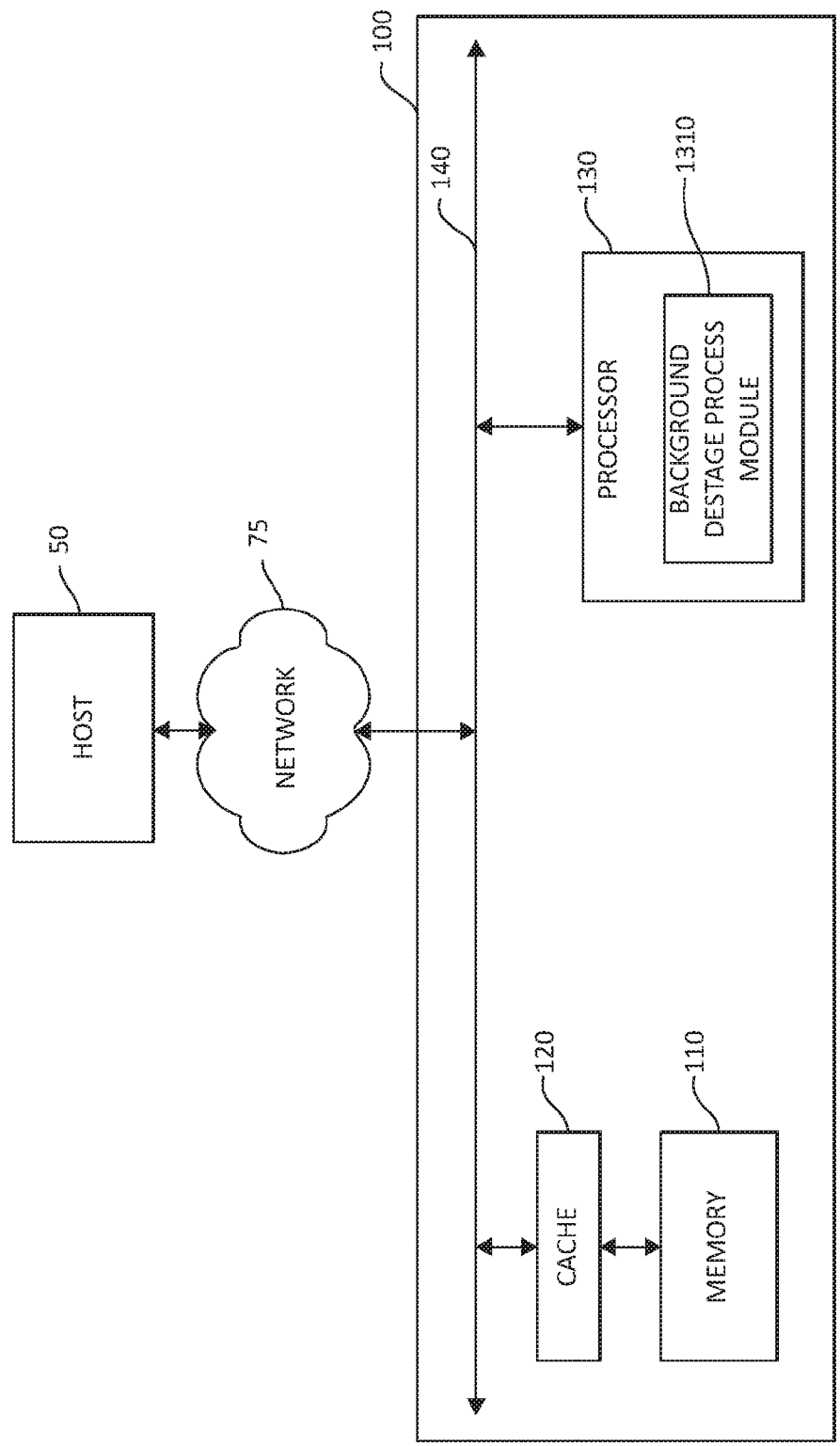
FIG. 1 is a block diagram of one embodiment of a system for background destaging storage tracks from a write cache.

Turning now to the figures, FIG. 1 is a block diagram of one embodiment of a system 100 for background destaging storage tracks from cache when one or more hosts 50 is/are idle. The embodiment illustrated in FIG. 1 shows host(s) 50 in communication with system 100 via a network 75 (e.g., the Internet, a local area network (LAN), a wide area network (WAN), a storage area network (SAN), and/or the like networks).

Each host 50 may be any type of computing device and/or computing system capable of performing the functions of a host and/or server. That is, host(s) 50 may be any computing device and/or computing system capable of reading and/or writing data to system 100.

System 100, at least in the illustrated embodiment, comprises a memory 110 coupled to a cache 120, and a processor 130 coupled to cache 120 via a bus 140 (e.g., a wired and/or wireless bus). Memory 110 may be any type of memory device known in the art. Examples of memory 110 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 110, storage tracks are capable of being stored in memory 110. Furthermore, each of the storage tracks can be destaged to memory 110 from cache 120 when data is written to the storage tracks.

Cache 120, in one embodiment, comprises a write cache partitioned into one or more ranks, where each rank includes one or more storage tracks. In various embodiments, host 50 is capable of writing data to the storage tracks stored in the various ranks of cache 120.

During operation, the storage tracks in each rank are destaged to memory 110 in a "foreground" destaging process after the storage tracks have been written to. That is, the foreground destage process destages storage tracks from the ranks to memory 110 while host 50 is actively writing to various storage tracks in the ranks of cache 120. Ideally, a particular storage track is not being destaged when one or more hosts 50 desire to write to the particular storage track.

In co-pending U.S. patent application Ser. No. 12/965,133, filed Dec. 10, 2010, which application is incorporated herein by reference, authored by the inventors of the present application, and assigned to the same assignee as the present application, discusses a method in which a foreground destage method destages storage tracks from a cache (e.g., cache 120) until a predetermined threshold percentage of memory is being used by the various ranks of the cache. That is, the foreground destage process destages storage tracks from each rank until the respective ranks each include a predetermined amount of storage tracks.

For example, if the write cache includes ten (10) ranks, each rank will be allocated ten percent (10%) of the total storage capacity of the write cache if each rank is allocated the same amount of storage space in the write cache, although two or more ranks may include different storage space allocations. If, the predetermined threshold for this example is thirty percent (30%), the foreground destage process will destage storage tracks from each rank until each rank is 30% full. In other words, the foreground destage process will destage storage tracks from each rank until each rank is using three (3%) of the total storage capacity of the write cache (i.e., 30%·10%=3%).

When a rank reaches its respective threshold, storage tracks are no longer destaged from the rank until the rank is written to by the host and the rank is using more than the threshold amount of storage space. After the predetermined threshold for each rank has been reached, a "background" destaging process may begin destaging the remaining storage tracks from the write cache if the host is not writing to a rank or the host is otherwise deemed idle, which is controlled by processor 130.

Processor 130, in one embodiment, comprises a background destage process module 1310 to control the background destaging process in cache 120. That is, background destage process module 1310 comprises code that, when executed by processor 130, causes processor 130 to perform a method for background destaging storage tracks from cache 120 when host(s) 50 is/are idle. The background destaging process may begin when the predetermined threshold of storage space is reached in a particular rank as discussed in the example above or when other predetermined conditions are met, which may vary depending on the application of the background destaging process.

In one embodiment, processor 130 is configured to monitor cache 120 for write operations from host(s) 50 to determine if host(s) 50 is/are idle. In one embodiment, idleness is determined at the cache level. In this embodiment, host(s) 50 is/are considered idle if host(s) 50 is/are not writing to storage tracks in cache 120. Alternatively, host(s) 50 is/are considered active or not idle if host(s) 50 is/are writing to one or more storage tracks in cache 120.

In another embodiment, idleness is determined at the rank level on a per rank basis. In this embodiment, host(s) 50 is/are considered idle with respect to a particular rank if host(s) 50 is/are not writing to storage tracks in that particular rank. Alternatively, host(s) 50 is/are considered active or not idle with respect to a particular rank if one or more of hosts 50 is writing to one or more storage tracks in that particular rank. As such, host(s) 50 may be considered idle with respect to a first rank and not idle or active with respect to a second rank in cache 120.

In one embodiment, when determining if host(s) 50 is/are idle, processor 130 is configured to set or reset a flag on cache 120 each time a host 50 writes to cache 120 in embodiments that determine idleness at the cache level. In another embodiment, processor 130 is configured to set or reset a flag on each respective rank each time a host 50 writes to the rank in embodiments that determine idleness at the rank level. In the various embodiments, the flag is set or reset to a predetermined count each time a host 50 writes to cache 120 or to a storage track in a particular rank.

The predetermined count may be any predetermined integer and/or fraction of an integer. In one embodiment, the predetermined count is two (2) counts. In other embodiments, the predetermined count is greater than or less than 2 counts, including fractions of counts.

Processor 130 is configured to decrement each flag in accordance with a predetermined amount of time from the last time a host 50 wrote to cache 120 in embodiments that determine idleness at the cache level or from the last time a host 50 wrote to each respective rank in embodiments that determine idleness at the rank level. In one embodiment, the predetermined amount of time for decrementing each flag is one (1) second. In other embodiments, the predetermined amount of time for decrementing each flag is greater than or less than one (1) second, including fractions of seconds.

Processor 130 is configured to refrain from destaging storage tracks when processor 130 determines that host(s) 50 is/are active or not idle. That is, processor 130 does not destage storage tracks when the flag count for cache 120 or the flag count on a flag for an associated rank is greater than zero. When processor 130 determines that host(s) 50 is/are idle (i.e., when the flag count for cache 120 or the flag count on a flag for an associated rank is equal to zero), processor 130 is configured to begin destaging storage tracks from each rank in cache 120 in embodiments that determine idleness at the cache level or from each rank for which host(s) 50 is/are determined to be idle with respect to in embodiments that determine idleness at the rank level.

In one embodiment, processor 130 is configured to destage storage tracks from each rank at a rate of four (4) storage tracks per second when performing the background destage process. In other embodiments, processor 130 is configured to destage storage tracks from each rank at a rate of one (1), two (2), or three (3) storage tracks per second when performing the background destage process. In still other embodiments, processor 130 is configured to destage storage tracks from each rank at a rate greater than four (4) storage tracks per second when performing the background destage process.

The following example may be helpful in understanding how host(s) 50 is/are determined to be idle at the rank level and how storage tracks are destaged from cache 120. In this example, cache 120 is partitioned into five (5) ranks (e.g., rank 1, rank 2, rank 3, rank 4, and rank 5), each being allocated twenty percent (20%) of the total storage space of cache 120 and where the predetermined threshold amount of storage space in each rank is thirty percent (30%) of their respective allocated amount of total storage space (e.g., 20%·30%=6%). In addition, each rank includes an associated flag for assisting processor 130 in determining if host(s) 50 is/are idle with respect to each rank (e.g., flag 1 is associated with rank 1, flag 2 is associated with rank 2, flag 3 is associated with rank 3, flag 4 is associated with rank 4, and flag 5 is associated with rank 5), each respective flag is incremented two (2) counts each time one of hosts 50 writes to is associated rank, each flag is decremented one (1) count every second after one of hosts 50 writes to a storage track in its associated rank, and four (4) storage tracks are destaged each time processor 130 determines that host(s) 50 is/are idle with respect to a particular rank. At time 1 (the predetermined threshold of 30% is reached in this example (i.e. each rank is storing 6% of the total storage space of cache 120)), one of hosts 50 writes to a storage track in each of rank 1, rank 2, rank 3, rank 4, and rank 5 and sets the flag count in each of flag 1, flag 2, flag 3, flag 4, and flag 5 to two counts. At time 2, one of hosts 50 (i.e., the same host or a different host) writes to one or more storage tracks in rank 1 and rank 4, and processor 130 increments flag 1 and flag 2 to two counts each and decrements flag 2, flag 3, and flag 5 by one count each such that flag 2, flag 3, and flag 5 are each at one count. At time 3, one of hosts 50 (i.e., the same host or a different host) writes to one or more storage tracks in rank 5 and in rank 4, and processor 130 increments flag 4 and flag 5 to two counts each and decrements each of flag 1, flag 2, and flag 3 by one count each such that flag 1 has one count, flag 2 has zero counts, and flag 3 has zero counts. At time 4, one of hosts 50 (i.e., the same host or a different host) writes to rank 4 and to rank 5, and processor 130 increments flag 4 and flag 5 to two counts each, decrements flag 1 to zero counts, and destages four storage tracks from each of rank 2 and rank 3. At time 5, none of hosts 50 write to any storage tracks and processor 130 will destage four storage tracks from each of rank 1, rank 2, and rank 3, and decrement rank 4 and rank 5 by one count each such that flag 4 and flag 5 each have one flag count. At time 6, one of hosts 50 (i.e., the same host or a different host) writes to one or more storage tracks in rank 5 and processor 130 will increment flag 5 to two flag counts, decrement flag 4 by one flag count such that flag 4 has zero flag counts, and destage four storage tracks from each of rank 1, rank 2, and rank 3. At time 7, one of hosts 50 (i.e., the same host or a different host) writes to one or more storage tracks in flag 5 and processor 130 will increment flag 5 to two flag counts and destage four storage tracks from each of rank 1, rank 2, rank 3, and rank 4. At time 8, one of host 50 (i.e., the same host or a different host) writes to one or more storage tracks in flag 5 and processor 130 will increment flag 5 to two flag counts and destage four storage tracks from each of rank 1, rank 2, rank 3, and rank 4. At time 9, none of hosts 50 write to any storage tracks in rank 5 and processor 130 decrements flag 5 by one flag count such that flag 5 has one flag counts and destage four storage tracks from each of rank 1, rank 2, rank 3, and rank 4. At time 10, none of hosts 50 write to any storage tracks in rank 5 and processor 130 destages four storage tracks from each of rank 1, rank 2, rank 3, rank 4, and rank 5. This process continues until all of the storage tracks are destaged from each respective rank and/or cache 120 or each respective rank is using more than the predetermined threshold amount of storage space.

Figure 2:
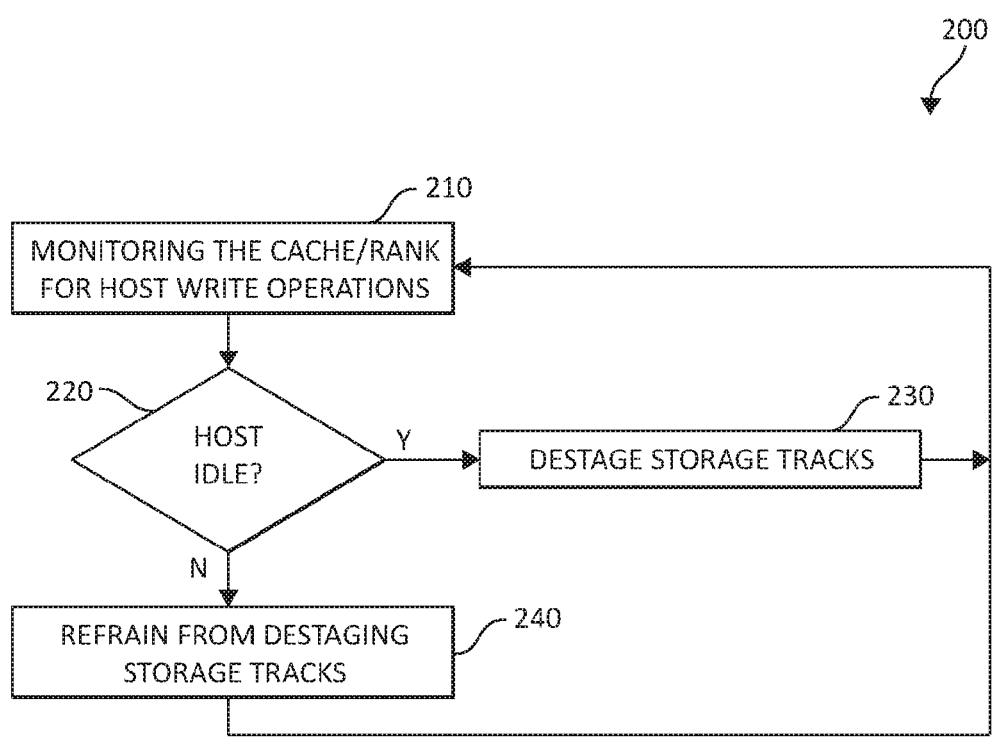
FIG. 2 is a flow diagram of one embodiment of a method for background destaging storage tracks from a write cache.

Turning now to FIG. 2, FIG. 2 is a flow diagram of one embodiment of a method 200 for background destaging storage tracks from a cache (e.g., cache 120) when one or more hosts (e.g., host(s) 50) is/are idle. At least in the illustrated embodiment, method 200 begins by monitoring the cache or each rank in the cache for write operations from the host(s) (block 210).

Method 200 further comprises determining if the host(s) is/are idle based on monitoring the cache (block 220). If the host(s) is/are determined to be idle, method 200 comprises destaging storage tracks from the cache or from one or more ranks in the cache for which the host(s) is/are determined to be idle with respect to (block 230). In one embodiment, storage tracks are destaged from the cache or from each rank at a rate of four (4) storage tracks per second when performing the background destage process. In other embodiments, storage tracks are destaged from the cache or from each rank at a rate of one (1), two (2), or three (3) storage tracks per second when performing the background destage process. In still other embodiments, storage tracks are destaged from the cache or from each rank at a rate greater than four (4) storage tracks per second when performing the background destage process. Method 200 then continues by monitoring the cache or each rank in the cache for write operations from the host(s) (block 210).

If the host(s) is/are determined to be active or not idle, method 200 comprises not destaging storage tracks or refraining from destaging storage tracks from the cache (block 240). Method 200 then continues by monitoring the cache or each rank in the cache for write operations from the host(s) (block 210).

Figure 3:
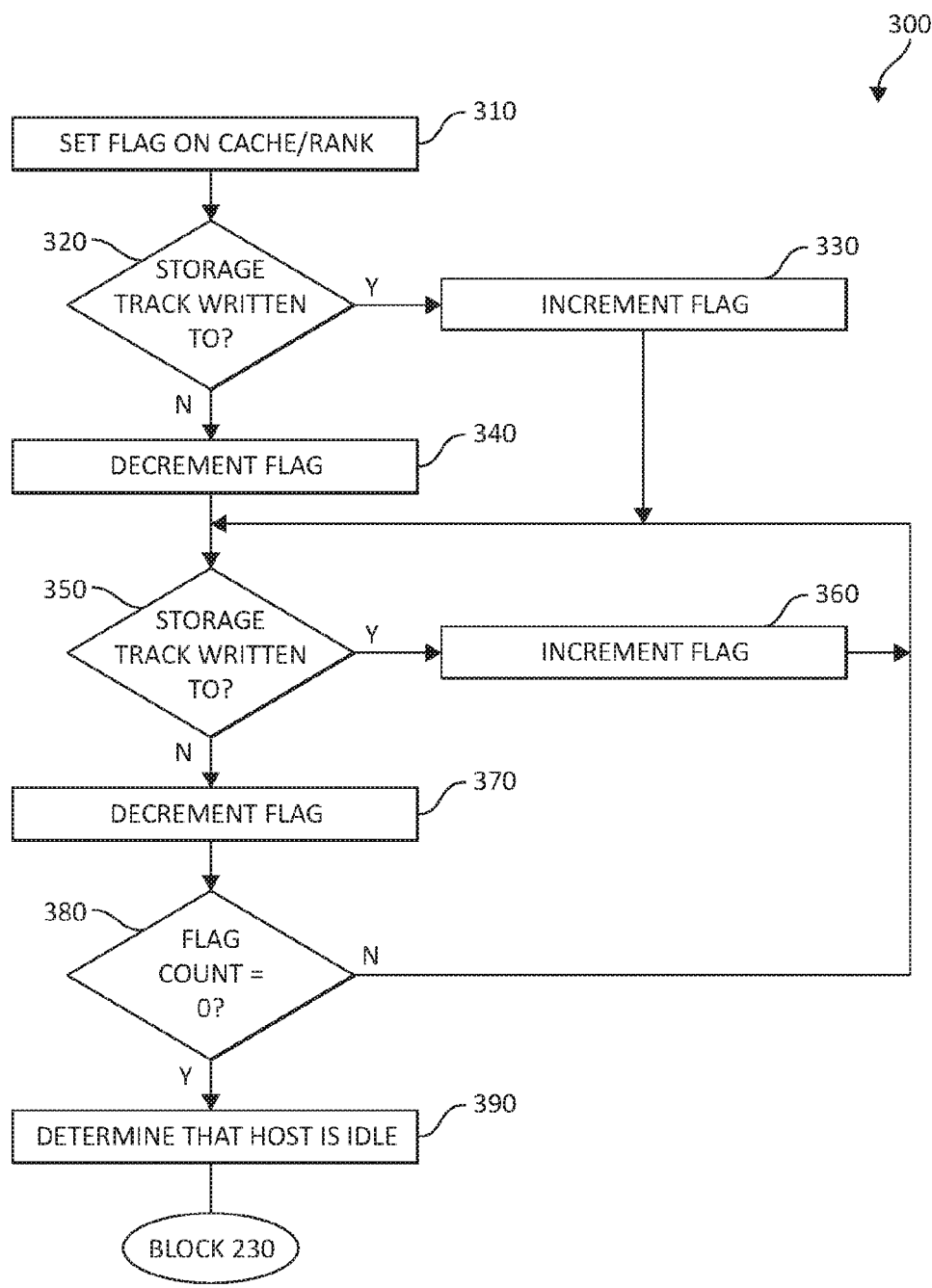
FIG. 3 is a flow diagram of one embodiment of a method for determining if one or more hosts is/are idle.

With reference now to FIG. 3, FIG. 3 is a flow diagram of one embodiment of a method 300 for determining if the host(s) is/are idle in method 200 (see block 220 in FIG. 2). At least in the illustrated embodiment, method 300 begins by setting a flag on the cache or on each respective flag when one of the hosts writes to the cache (block 310).

Method 300 continues by determining if one or more storage tracks in the cache or in each respective rank in the cache was written to during a cycle (block 320). If the cache or a particular rank in the cache was written to during the cycle, the flag for the cache or the flag for each respective rank is incremented by/to a predetermined count (block 330). The predetermined count may be any predetermined integer and/or fraction of an integer. In one embodiment, the predetermined count is two (2) counts. In other embodiments, the predetermined count is greater than or less than 2 counts, including fractions of counts. Method 300 then continues by again determining if one or more storage tracks in the cache or in each respective rank in the cache was written to during a subsequent cycle (block 350).

If the cache or a particular rank in the cache was not written to during the cycle, the flag for the cache or the flag for each respective rank is decremented by a predetermined decrement count (block 340). In one embodiment, the predetermined amount of time for decrementing each flag is one (1) second. In other embodiments, the predetermined amount of time for decrementing each flag is greater than or less than one (1) second, including fractions of seconds. Method 300 then continues by again determining if one or more storage tracks in the cache or in each respective rank in the cache was written to during a subsequent cycle (block 350).

If the cache or a particular rank in the cache was written to during the subsequent cycle (i.e., at block 350), the flag for the cache or the flag for each respective rank is incremented by/to the predetermined count (block 360). Method 300 then continues by again determining if one or more storage tracks in the cache or in each respective rank in the cache was written to during a subsequent cycle (block 350).

If the cache or a particular rank in the cache was not written to during the subsequent cycle, the flag for the cache or the flag for each respective rank is decremented by the predetermined decrement count (block 370). Method 300 continues by determining if the flag count for the cache or for one or more ranks in the cache are equal to zero (block 380). If the flag count for the cache or for the ranks in the cache are greater than zero (i.e., not equal to zero), method 300 then continues by again determining if one or more storage tracks in the cache or in each respective rank in the cache was written to during a subsequent cycle (block 350).

If the flag count for the cache or for the ranks in the cache are equal to zero, the host is determined to be idle with respect to the cache or with respect to one or more storage tracks in the cache (block 390). Storage tracks are then destaged from the cache or from one or more ranks in the cache (see block 230 in method 200 above).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

The invention claimed is:

1. A method for background destaging storage tracks from a write cache configured to store a plurality of storage tracks when at least one host is idle using a processor device, the method comprising:
   destaging storage tracks from each respective rank when it is determined that the at least one host is idle with respect to a first set of ranks;
   refraining from destaging storage tracks from each rank when it is determined that the at least one host is not idle with respect to a second set of ranks;
   destaging storage tracks from the write cache if the at least one host is idle;
   refraining from destaging storage tracks from the write cache if the at least one host is not idle;
   monitoring each rank for write operations from the at least one host; and
   determining if the at least one host is idle with respect to each respective rank based on monitoring each rank for write operations from the at least one host such that the at least one host may be determined to be idle with respect to the first rank and not idle with respect to the second rank.

2. The method of claim 1, further comprising performing each one of:
   partitioning the write cache into a plurality ranks each comprising a portion of the plurality of storage tracks,
   monitoring the write cache for write operations from the at least one host, and
   determining if the at least one host is idle based on monitoring the write cache for write operations from the at least one host.

3. The method of claim 2, further comprising destaging four (4) tracks per second from each respective rank in which the at least one host is determined to be idle with respect to.

4. The method of claim 3, further comprising:
   determining that the at least one host is idle with respect to the first particular rank when the at least one host does not write to at least one storage track in the first particular rank within a predetermined amount of time when determining if the at least one host is idle with respect to each rank; and
   determining that the at least one host is not idle with respect to the second particular rank when the at least one host writes to at least one storage track in the second particular rank within the predetermined amount of time when determining if the at least one host is idle with respect to each rank.

5. The method of claim 4, further comprising setting a flag to a predetermined count on each respective rank every time one of the at least one host writes to at least one storage track on each rank.

6. The method of claim 5, further comprising decrementing the flag on each respective rank for every predetermined unit of time in which the at least one host does not write data to each rank.

7. A system for background destaging storage tracks from cache when at least one host is idle, the system comprising:
   a write cache configured to store a plurality of storage tracks and configured to be coupled to the at least one host; and
   a processor coupled to the write cache, wherein the processor comprises code that, when executed by the processor, causes the processor to:
      destage storage tracks from each respective rank when it is determined that the at least one host is idle with respect to a first set of ranks;
      refrain from destaging storage tracks from each rank when it is determined that the at least one host is not idle with respect to a second set of ranks;
      destages storage tracks from the write cache if the at least one host is idle;
      refrains from destaging storage tracks from the write cache if the at least one host is not idle;
      monitors each rank for write operations from the at least one host; and
      determines if the at least one host is idle with respect to each respective rank based on monitoring each rank for write operations from the at least one host such that the at least one host may be determined to be idle with respect to the first rank and not idle with respect to the second rank.

8. The system of claim 7, wherein the processor performs each one of:
   partitioning the write cache into a plurality ranks each comprising a portion of the plurality of storage tracks,
   monitoring the write cache for write operations from the at least one host, and
   determining if the at least one host is idle based on monitoring the write cache for write operations from the at least one host.

9. The system of claim 8, wherein the processor utilizes four (4) destage tasks per second from each rank in which the at least one host is determined to be idle with respect to.

10. The system of claim 8, wherein the processor:
    determines that the at least one host is idle with respect to the first particular rank when the at least one host does not write to at least one storage track in the first particular rank within a predetermined amount of time when determining if the at least one host is idle with respect to each rank; and
    determines that the at least one host is not idle with respect to the second particular rank when the at least one host writes to at least one storage track in the second particular rank within the predetermined amount of time when determining if the at least one host is idle with respect to each rank.

11. The system of claim 10, wherein the processor sets a flag to a predetermined count on each respective rank every time the at least one host writes to at least one storage track in a particular rank.

12. The system of claim 11, wherein the processor decrements the flag on each respective rank for every predetermined unit of time in which the at least one host does not write data to at least one storage track in a particular rank.

13. A physical computer storage memory comprising a computer program product for background destaging storage tracks from a write cache configured to store a plurality of storage tracks when at least one host is idle, the computer program product comprising:
   computer code for destaging storage tracks from each respective rank when it is determined that the at least one host is idle with respect to a first set of ranks;
   computer code for refraining from destaging storage tracks from each rank when it is determined that the at least one host is not idle with respect to a second set of ranks;
   computer code for destaging storage tracks from the write cache if the at least one host is idle;
   computer code for refraining from destaging storage tracks from the write cache if the at least one host is not idle;
   computer code for monitoring each rank for write operations from the at least one host; and
   computer code for determining if the at least one host is idle with respect to each respective rank based on monitoring each rank for write operations from the at least one host such that the at least one host may be determined to be idle with respect to the first rank and not idle with respect to the second rank.

14. The physical computer storage memory of claim 13, wherein the computer program product further comprises:
   computer code for monitoring the write cache for write operations from the at least one host; and
   computer code for determining if the at least one host is idle based on monitoring the write cache for write operations from the at least one host.

15. The physical computer storage memory of claim 14, wherein the computer program product further comprises computer code for utilizing four (4) destage tasks per second from each respective rank in which the at least one host is determined to be idle with respect to.

16. The physical computer storage memory of claim 14, wherein the computer program product further comprises:
   computer code for determining that the at least one host is idle with respect to the first particular rank when the at least one host does not write to at least one storage track in the first particular rank within a predetermined amount of time when determining if the at least one host is idle with respect to each rank; and
   computer code for determining that the at least one host is not idle with respect to the second particular rank when the at least one host writes to at least one storage track in the second particular rank within the predetermined amount of time when determining if the at least one host is idle with respect to each rank.

17. The physical computer storage memory of claim 16, wherein the computer program product further comprises computer code for:
   setting a flag to a predetermined count on each respective rank every time one of the at least one host writes to at least one storage track on each rank; and
   decrementing the flag on each respective rank for every predetermined unit of time in which the at least one host does not write data to each rank.

* * * * *